(12) United States Patent
Kovács et al.

(10) Patent No.: US 12,476,801 B2
(45) Date of Patent: Nov. 18, 2025

(54) AUTO COMPENSATED QUANTUM KEY DISTRIBUTION TRANSMITTER, RECEIVER, SYSTEM AND METHOD

(71) Applicant: Telefonaktiebolaget LM Ericsson (publ), Stockholm (SE)

(72) Inventors: Benedek Kovács, Budapest (HU); Sándor Jókai, Budapest (HU); Márton Czermann, Dunakeszi (HU); László Bacsárdi, Sopron (HU); Zsolt Kis, Pilisvörösvár (HU)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 168 days.

(21) Appl. No.: 18/268,717

(22) PCT Filed: Dec. 22, 2020

(86) PCT No.: PCT/EP2020/087716
§ 371 (c)(1),
(2) Date: Jun. 21, 2023

(87) PCT Pub. No.: WO2022/135704
PCT Pub. Date: Jun. 30, 2022

(65) Prior Publication Data
US 2024/0048368 A1 Feb. 8, 2024

(51) Int. Cl.
*H04L 9/08* (2006.01)
*H04B 10/70* (2013.01)

(52) U.S. Cl.
CPC .......... *H04L 9/0852* (2013.01); *H04B 10/70* (2013.01); *H04L 9/0819* (2013.01)

(58) Field of Classification Search
CPC ...... H04L 9/0852; H04L 9/0819; H04B 10/70
See application file for complete search history.

(56) References Cited

U.S. PATENT DOCUMENTS 11,271,661 B2   3/2022   Yoshino
2007/0098402 A1* 5/2007  Maeda ................ H04B 10/66
                                              398/38

(Continued)

FOREIGN PATENT DOCUMENTS

EP   1780912 A1    5/2007
WO   2019180770 A1 9/2019

OTHER PUBLICATIONS

International Search Report and Written Opinion of the International Searching Authority, PCT/EP2020/087716, mailed Sep. 23, 2021, 18 pages.

(Continued)

*Primary Examiner* — Baotran N To
(74) *Attorney, Agent, or Firm* — Sage Patent Group

(57) ABSTRACT

Quantum key distribution, QKD, transmitter apparatus including a beam splitter configured to receive an initial pulse train of optical pulse pairs, a first photodetector, an optical storage line, a phase modulator, a polarisation rotation mirror, a second photodetector and processing circuitry configured to:
determine first arrival times, $t_i^{in}$, of optical pulses detected at the first photodetector;
determine second arrival times, $t_i^{out}$, of optical pulses detected at the second photodetector;
determine a time delay, t, based on a time difference, Dt, between a second arrival time and a respective first arrival time; and
generate an electric modulation signal configured to cause the optical phase modulator to phase modulate one of the optical pulses of optical pulse pairs of the second pulse train for modulation periods based on respective first arrival times plus the time delay.

14 Claims, 8 Drawing Sheets

(56) References Cited

U.S. PATENT DOCUMENTS

| | | | | |
|---|---|---|---|---|
| 2013/0016835 | A1* | 1/2013 | Zbinden | H04B 10/70 380/255 |
| 2017/0317814 | A1* | 11/2017 | Grice | H04B 10/70 |
| 2021/0021352 | A1* | 1/2021 | Yoshino | H04B 10/556 |
| 2021/0119786 | A1* | 4/2021 | Bucklew | H04L 9/0852 |

OTHER PUBLICATIONS

Cheng, Quangming et al., "Wavelength division multiplexing quantum key distribution network using a modified plug-and-play system," Opt Quant Electron, vol. 47, No. 7, 2015, pp. 1809-1817.
Muller, A. et al., "'Plug and play' systems for quantum cryptography," Appl Phys Lett, 70, 6 pages.
Zambra, Guido et al., "Experimental Reconstruction of Photon Statistics without Photon Counting," Phys Rev Lett 95, 063602, 2005, 4 pages.
Stucki, D et al., "Quantum key distribution over 67 km with a plug&play system," New Journal of Physics 4, 2002, 8 pages.
Ruiz-Alba, A. et al., "Practical Quantum Key Distribution based on the BB84 protocol," Waves 2010, Year 2, 11 pages.

* cited by examiner

804

812 Power split the optical pulses of the input pulse train to form a first pulse train and a second pulse train

814 Apply an attenuation to the optical pulses of the second pulse train

816 Transmit the attenuated second pulse train through an optical storage line and an optical phase modulator

818 Polarisation rotate the optical pulses of the second pulse train and reflect said optical pulse back through the optical phase modulator and the optical storage line

820 Power split the reflected optical pulses of the second pulse train to form the output pulse train

Fig. 10

AUTO COMPENSATED QUANTUM KEY DISTRIBUTION TRANSMITTER, RECEIVER, SYSTEM AND METHOD

CROSS REFERENCE TO RELATED APPLICATIONS

This application is a 35 U.S.C. § 371 national stage application of PCT International Application No. PCT/EP2020/087716 filed on Dec. 22, 2020, the disclosure and content of which is incorporated by reference herein in its entirety.

TECHNICAL FIELD

The invention relates to quantum key distribution, QKD, transmitter apparatus. The invention further relates to an auto-compensating QKD system, a QKD receiver for an auto-compensating QKD system, a QKD transmitter for an auto-compensating QKD system and a method of synchronising a QKD receiver and a QKD transmitter of an auto-compensating QKD system.

BACKGROUND

Quantum communication systems exploit the possibility of transmitting information encoded in quantum states, prepared in such a way that an eavesdropper in between two communicating partners unavoidably introduces a detectable disturbance. In optical communications, the quantum information is encoded over a physical property of a photon, as for example polarization state or phase.

Quantum Key Distribution, QKD, provides a solution to the problem of key distribution in symmetric encryption systems. In theory, quantum encryption should be applied to the whole message that is to be transmitted, using one-time pad encryption. However, this would unacceptably compromise capacity and latency of the communication channel, since feasible QKD systems can only work up to a few Mbit/s and require processing time for the sender and receiver to agree the final key, free of errors. In practice, QKD is only used to produce and distribute the key, not to transmit message data. The key is then used with a classical encryption algorithm to encrypt and decrypt a message, transmitted over a classical high capacity communication channel.

In QKD based on the BB84 protocol, as described for example by A. Ruiz-Alba et al "Practical Quantum Key Distribution based on the BB84 protocol", Waves, 2011, pages 4-14, the sender, Alice, generates a random bit, i.e. a "0" or a "1", and encodes it in one of two different bases over a properly chosen physical property of the photon. One of the bases is then used to encode the "0" bits and the other is used to encode the "1" bits.

Since the receiver, Bob, does not know Alice's basis selection, he measures the basis of the incoming photons by randomly choosing one of the possible two basis. If he uses the same basis used by Alice, he will measure deterministically the correct bit value. Conversely, if he chooses the wrong basis, the result of his measurement will be a random projection on the possible values of the encoded basis, which gives the correct result only with a 50% probability. After a long sequence of photons has been exchanged, Alice and Bob compare the basis they have respectively employed for encoding and measuring, communicating via a "classical" channel. They keep only the random bits generated and detected with matched basis, which are said to constitute the "sifted keys". In an ideal system without noise, imperfections, and disturbances, the sifted keys are identical, and can be used as a private key.

In the so-called "Plug & play" auto compensating QKD system reported by D Stucki et al, "Quantum key distribution over 67 km with a plug & play system", *New J. Phys.* Issue 4 2002, pages 41.1-41.8, the key is encoded in the phase difference between two pulses travelling from Bob to Alice and back. In this system, optical pulses generated at Bob are split by a 50/50 beam splitter, BS, travel through a short arm and a long arm, including a phase modulator, PM, and a 50 ns delay line, DL, of an interferometer to a polarization beam splitter, PBS. All fibres and optical elements at Bob are polarization maintaining and the linear polarization is rotated by 90° in the short arm, so both pulses exit from the same output of the PBS. Pairs of pulses are thus output from Bob and transmitted to Alice. At Alice, the pulses are reflected by a Faraday mirror (undergoing 90° polarization rotation), attenuated at a variable attenuator, ATT, and are transmitted by to Bob orthogonally polarized. To implement the BB84 protocol in this system the phase modulator, PM, at Alice applies a phase shift chosen from 0 and $\pi$ or $\pi/2$ or $3\pi/2$ on the second pulse and Bob chooses the measurement basis by applying a phase shift of 0 or $\pi/2$ on the first pulse using its PM. Since the pulses transmitted from Alice to Bob now have the orthogonal polarizations, each takes the other path through the interferometer at Bob and arrive at the BS at the same time, where they interfere; since each pulse has travelled the same path from Bob to Alice and back, the system is auto-compensated. The resultant pulses output from the BS are detected at the single photon detectors, SPAD1 and SPAD2, depending on the measurement basis selected by Bob.

At Alice, the PM should phase modulate the second pulse of the pulse-pairs. The time separation between the first and second pulse of a pulse-pair is of the order of tens of nanoseconds, hence the timing of the drive signal to the PM needs to be very accurate. At Bob, the PM should phase modulate the pulses returning from Alice. The time separation between pulse-pairs is approximately 200 ns, hence the round trip time of the pulses should be known to better than this accuracy. The SPADs (single-photon avalanche diodes) at Bob are gated so that they are set to an active state when the returning pulses arrive, which also requires precise knowledge of the round-trip time of the pulses.

SUMMARY

It is an object to provide an improved QKD transmitter apparatus. It is a further object to provide an improved auto-compensating QKD system. It is a further object to provide an improved QKD receiver for an auto-compensating QKD system. It is a further object to provide an improved QKD transmitter for an auto-compensating QKD system. It is a further object to provide an improved method of synchronising a QKD receiver and a QKD transmitter of an auto-compensating QKD system.

An aspect of the invention provides quantum key distribution, QKD, transmitter apparatus comprising an optical beam splitter, first and second photodetectors, an optical storage line, an optical phase modulator, a polarisation rotation mirror and processing circuitry. The optical beam splitter is configured to receive an initial pulse train of optical pulse pairs and is configured to power split the optical pulses of the initial pulse train to form a first pulse train of optical pulse pairs and a second pulse train of optical pulse pairs. The first photodetector is configured to detect optical pulses of the first pulse train. The optical storage line is configured to receive the second pulse train. The optical phase modulator is provided at an output of the optical storage line and is configured to phase modulate optical pulses of the second pulse train. The polarisation rotation mirror is arranged to reflect the optical pulses of the second pulse train back into the optical phase modulator. The optical beam splitter is further configured to power split the optical pulses of the reflected second pulse train to form a third pulse train and a fourth pulse train, the fourth pulse train forming a return pulse train of the QKD transmitter. The second photodetector is configured to detect optical pulses of the third pulse train. The processing circuitry is configured to determine first arrival times, $t_i^{in}$, of optical pulses detected at the first photodetector and to determine second arrival times, $t_i^{out}$, of optical pulses detected at the second photodetector. The processing circuitry is additionally configured to determine a time delay, $\tau$, based on a time difference, $\Delta t$, between a second arrival time and a respective first arrival time. The processing circuitry is further configured to generate an electric modulation signal configured to cause the optical phase modulator to phase modulate one of the optical pulses of optical pulse pairs of the second pulse train for modulation periods based on respective first arrival times plus the time delay.

The structure and operation of the QKD transmitter apparatus enables the time delay introduced by the storage line to be accurately determined, enabling any variation in the length of the storage line due to ambient temperature changes to be taken into account. It may enable the time delay introduced by the storage line to be determined with an accuracy of a few ns. By accurately knowing the time delay introduced by the storage line, the timing accuracy of the electric modulation signal for driving the phase modulator may be improved, thus ensuring that only one of the optical pulses in a pulse pair is phase modulated.

In an embodiment, the time delay is based on the time difference, $\Delta t$, plus a time delay, $\Delta t_{PD1}$, between the optical beam splitter and the first photodetector, and less a time delay, $\Delta t_{PD2}$, between the optical beam splitter and the second photodetector. This removes the time delays associated with travel from the beam splitter to each of the photodetectors which may further improve the accuracy of the determined time delay introduced by the storage line and thus the timing accuracy of the electric modulation signal for driving the phase modulator.

In an embodiment, the processing circuitry is configured to obtain a time separation between first optical pulses and second optical pulses of the optical pulse pairs and wherein the modulation periods are further based on said time separation. This may further improve the timing accuracy of the electric modulation signal for driving the phase modulator, enabling accurate phase modulation of the second optical pulses of the pulse pairs.

In an embodiment, the QKD transmitter apparatus further comprises a variable optical attenuator, VOA, provided between the optical beam splitter and the optical phase modulator. The VOA has an operating attenuation and a synchronisation attenuation, lower than the operating attenuation. The processing circuitry is configured to generate a control signal configured to cause the VOA to be configured to apply the synchronisation attenuation before the initial pulse train is received. Provision of a VOA enables the mean photon number of the pulses to be reduced to less than 1 for key transmission. The ability to configure the VOA with a lower attenuation during synchronisation of the QKD transmitter, i.e. while determining the time delay introduced by the storage line, enables the optical pulses to have a higher mean photon number for synchronisation, which may improve the accuracy of detection of optical pulses of the third pulse train by the second photodetector.

In an embodiment, processing circuitry is configured to generate an electric modulation signal configured to cause the optical phase modulator to phase modulate the second optical pulse of optical pulse pairs of the second pulse train.

An aspect of the invention provides an auto-compensating quantum key distribution, QKD, system comprising a QKD transmitter and a QKD receiver. The QKD receiver, Bob, comprises an optical source, an optical phase modulator, an optical detector and processing circuitry. The optical source is configured to transmit an initial pulse train of optical pulses to the QKD transmitter. The optical phase modulator is configured to phase modulate optical pulses of a return pulse train received from the QKD transmitter. The optical detector is configured to detect optical pulses of the return pulse train, the optical detector having a detection efficiency of less than 1. The processing circuitry is configured to determine arrival times of detected optical pulses and to determine a round trip time between the QKD receiver and the QKD transmitter based on at least one said arrival time. The QKD transmitter, Alice, comprises an optical beam splitter, a photodetector, a variable optical attenuator, VOA, an optical storage line, an optical phase modulator, a polarisation rotation mirror and processing circuitry. The optical beam splitter is configured to receive the initial pulse train and is configured to power split the optical pulses of the initial pulse train to form a first pulse train and a second pulse train. The photodetector is configured to detect optical pulses of the first pulse train. The VOA is configured to attenuate optical pulses of the second pulse train. The optical storage line is configured to receive the second pulse train output from the VOA. The optical phase modulator is provided at an output of the optical storage line and is configured to phase modulate optical pulses of the second pulse train. The polarisation rotation mirror is arranged to reflect the optical pulses of the second pulse train back into the optical phase modulator. The optical beam splitter is further configured to form the reflected second pulse train into the return pulse train. The processing circuitry is configured to generate a control signal configured to cause the VOA to be configured to apply a synchronisation attenuation before the second pulse train is received, the synchronisation attenuation configured to cause the optical pulses to have a mean photon number of greater than 1.

The structure and operation of the auto-compensating QKD system advantageously improves the accuracy with which the round-trip time from Bob to Alice and back may be determined, enabling the round-trip time to be determined with an accuracy of better than a temporal separation between pulses, or pulse-pairs, of the initial pulse train. The structure and operation of the auto-compensating QKD system also advantageously enables synchronisation of the QKD receiver (Bob) without requiring use of an optical detector having a fast gating mechanism. The improved accuracy of the determined round-trip time enables the optical detector to be set to an active state by the time optical pulses from the return pulse train arrive using an electric gating signal. Advantageously, the system is application agnostic and can be implemented as a service in an existing installed communications network.

In an embodiment, the mean photon number multiplied by the detection efficiency is at least 1. This advantageously makes it considerably more probable that the first optical pulse of the return pulse train will be detected at the QKD receiver (Bob) than the following optical pulses. This may further improve the accuracy of the determination of the round-trip time from Bob to Alice and back.

In an embodiment, the optical source is configured to transmit a plurality of instances of the initial pulse train. The QKD receiver further comprises a time-to-digital converter configured to assign timestamps to optical signals detected by the optical detector. The processing circuitry is configured to determine bunching points of the timestamps, filter the timestamps to remove timestamps outside detection windows around the bunching points and determine arrival times of detected optical pulses based on the filtered timestamps. This advantageously enables false detections at the optical detector due to dark noise to be removed, improving the accuracy of determining the arrival times of the optical pulses, thus improving the accuracy of the determined round-trip time.

In an embodiment, the processing circuitry is further configured to determine a repetition rate of the optical pulses of the initial pulse train by Fourier transformation of the filtered timestamps. This advantageously enables the required accuracy of the round-trip time to be determined.

Corresponding embodiments and advantages apply to the QKD receiver, the QKD transmitter and the method described below.

An aspect of the invention provides a QKD receiver for an auto-compensating QKD system, the QKD receiver comprising an optical source, an optical phase modulator, an optical detector and processing circuitry. The optical source is configured to transmit a pulse train of optical pulses. The optical phase modulator is configured to phase modulate optical pulses of a return pulse train received from a QKD transmitter of the auto-compensating QKD system. The optical detector is configured to detect optical pulses of the return pulse train; the optical detector has a detection efficiency of less than 1. The processing circuitry is configured to determine arrival times of detected optical pulses and to determine a round trip time between the QKD receiver and the QKD transmitter based on at least one said arrival time.

An aspect of the invention provides a QKD transmitter for an auto-compensating QKD system, the QKD transmitter comprising an optical beam splitter, a photodetector, a variable optical attenuator, VOA, an optical storage line, an optical phase modulator, a polarisation rotation mirror and processing circuitry. The optical beam splitter is configured to receive an initial pulse train and is configured to power split the optical pulses of the initial pulse train to form a first pulse train and a second pulse train. The photodetector is configured to detect optical pulses of the first pulse train. The VOA is configured to attenuate optical pulses of the second pulse train. The optical storage line is configured to receive the second pulse train output from the VOA. The optical phase modulator is provided at an output of the optical storage line and is configured to phase modulate optical pulses of the second pulse train. The polarisation rotation mirror is arranged to reflect the optical pulses of the second pulse train back into the optical phase modulator. The optical beam splitter is further configured to form the reflected second pulse train into a return pulse train of the QKD transmitter. The processing circuitry is configured to generate a control signal configured to cause the VOA to be configured to apply a synchronisation attenuation before the second pulse train is received, the synchronisation attenuation configured to cause the optical pulses to have a mean photon number of greater than 1.

An aspect of the invention provides a method of synchronising a quantum key distribution, QKD, receiver and a QKD transmitter of an auto-compensating QKD system. The method comprises the following steps. A step of sending an initial pulse train of optical pulses from the QKD receiver to the QKD transmitter. A step, at the QKD transmitter, of applying an attenuation to the optical pulses of the initial pulse train to form an attenuated pulse train. A step, at the QKD transmitter, of forming a return pulse train from the attenuated pulse train. A step of sending the return pulse train from the QKD transmitter to the QKD receiver. A step, at the QKD receiver, of detecting optical pulses of the return pulse train with a detection efficiency of less than 1. The attenuation is configured to cause the optical pulses to have a mean photon number of greater than 1.

In an embodiment, applying an attenuation comprises power splitting the optical pulses of the initial pulse train to form a first pulse train and a second pulse train, and applying an attenuation to the optical pulses of the second pulse train. Forming a return pulse train comprises transmitting the attenuated second pulse train through an optical storage line and an optical phase modulator. Then, polarisation rotating the optical pulses of the second pulse train and reflecting said optical pulse back through the optical phase modulator and the optical storage line. Then power splitting the reflected optical pulses of the second pulse train to form the return pulse train.

In an embodiment, the mean photon number multiplied by the detection efficiency is at least 1.

In an embodiment, the steps are performed for a plurality of instances of the initial pulse train. The method further comprises the following steps, at the QKD receiver. A step of assigning timestamps to detected optical signals. A step of determining bunching points of the timestamps. A step of filtering the timestamps to remove timestamps outside detection windows around the bunching points. A step of determining arrival times of detected optical pulses based on the filtered timestamps. A step of determining a round trip time between the QKD receiver and the QKD transmitter based on at least one said arrival time.

Embodiments of the invention will now be described, by way of example only, with reference to the accompanying drawings.

BRIEF DESCRIPTION OF THE DRAWINGS

FIGS. 8 to 11 are flowcharts illustrating embodiments of method steps.

DETAILED DESCRIPTION

The same reference numbers will be used for corresponding features in different embodiments.

Figure 1:
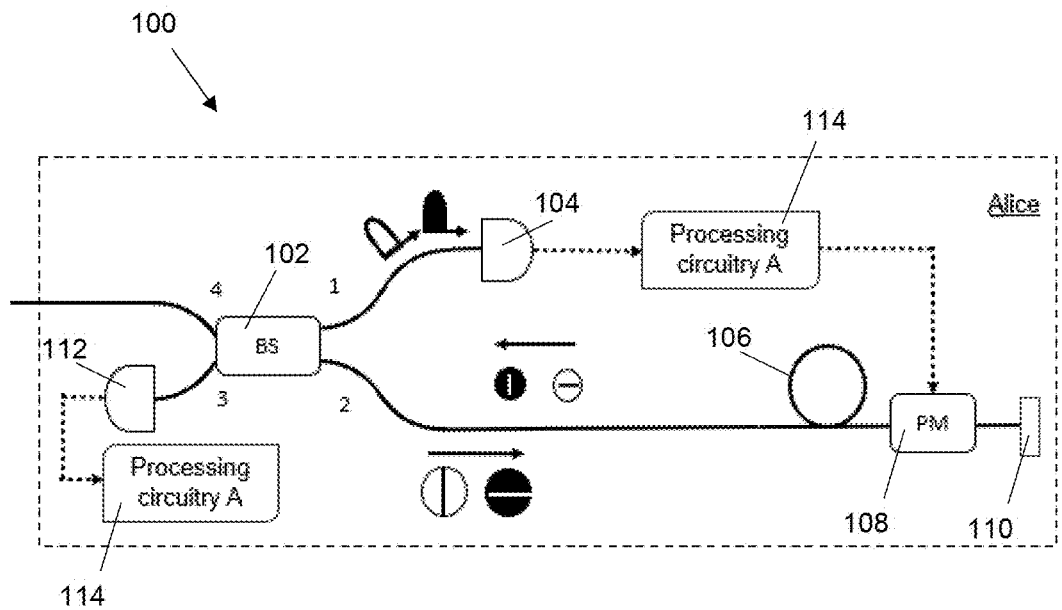
FIGS. 1 and 2 are schematic diagrams illustrating embodiments of QKD transmitter apparatus.

Referring to FIG. 1, an embodiment of the invention provides QKD transmitter apparatus 100 comprising an optical beam splitter, BS, 102, a first photodetector 104, a second photo detector 112, an optical storage line 106, an optical phase modulator, PM, 108, a polarisation rotation mirror 110 and processing circuitry 114.

The BS 102 is configured to receive an initial pulse train of optical pulse pairs at one of its input/output ports, in this example port 4. The BS is configured to power split the optical pulses of the initial pulse train to form a first pulse train of optical pulse pairs, output at port 1, and a second pulse train of optical pulse pairs, output at port 2.

The first photodetector 104 is arranged downstream of port 1 of the BS and is configured to detect optical pulses of the first pulse train output from the BS.

The optical storage line 106 is arranged downstream of port 2 of the BS and is configured to receive the second pulse train output from the BS. The PM 108 is provided at an output of the optical storage line and is configured to phase modulate optical pulses of the second pulse train. The polarisation rotation mirror 110 is arranged downstream of the PM to reflect the optical pulses of the second pulse train back into the PM. As is illustrated by the black and white discs with lines through, the polarisation of the pulses is rotated by 90° on reflection by the polarisation rotation mirror. The polarisation rotated reflected optical pulses then travel back through the storage line to the BS.

The BS is further configured to power split the optical pulses of the reflected second pulse train, received at port 2, to form a third pulse train, output from port 3, and a fourth pulse train, output from port 4. The fourth pulse train forms a return pulse train of the QKD transmitter. The second photodetector 112 is configured to detect optical pulses of the third pulse train.

The processing circuitry 114 is configured to:
- determine first arrival times, $t_l^{in}$, of optical pulses detected at the first photodetector;
- determine second arrival times, $t_l^{out}$, of optical pulses detected at the second photodetector;
- determine a time delay, $\tau$, based on a time difference, $\Delta t$, between a second arrival time and a respective first arrival time; and
- generate an electric modulation signal configured to cause the PM to phase modulate one of the optical pulses of optical pulse pairs of the second pulse train.

By only phase modulating one optical pulse in a pulse pair the QKD transmitter encodes key information in the phase difference between the optical pulses of a pulse pair. The electric modulation signal configured to cause the PM to apply the phase modulation for modulation periods based on respective first arrival times of the optical pulses plus the time delay.

In an embodiment, the time delay is based on the time difference, $\Delta t$, plus a time delay, $\Delta t_{PD1}$, between the optical beam splitter and the first photodetector, and less a time delay, $\Delta t_{PD2}$, between the optical beam splitter and the second photodetector.

In an embodiment, the time delay, $\tau$, is calculated as:

$$\tau = \left(\frac{1}{N}\sum_{l=1...N} \Delta t_l - \Delta t_{PD2} + \Delta t_{PD1}\right)/2$$

The processing circuitry 114 determines a sequence of first arrival times, $t_l^{in}$, for l=1 to N, where N is the number of pulse pairs in the second pulse train, and a sequence of second arrival times, $t_l^{out}$, for l=1 to N. There are exactly the same amount of records in both sequences. Hence one can subtract the two time sequences one by one yielding N time differences $\Delta t_l = t_l^{out} - t_l^{in}$.

The time differences are related to the temporal length of the storage line as:

$$\Delta t = \left(\frac{1}{N}\sum_{l=1...N} \Delta t_l - \Delta t_{PD2} + \Delta t_{PD1}\right)$$

where $$\left(\frac{1}{N}\sum_{l=1...N} \Delta t_l\right)$$

represents averaging the measured time intervals $\Delta t_l$, $\Delta t_{PD1}$ is the temporal delay between the beam splitter and the first photodetector 140, and $\Delta t_{PD2}$ is the temporal delay between the beam splitter and the first photodetector 140 and the second photodetector 112. The electric modulation signal sent to the PM 108 should be delayed with respect to the first arrival time for each pulse-pair by the time delay, $\tau$, so that the modulation periods are accurately applied to the desired one of the optical pulses in the optical pulse pairs.

In an embodiment, the first (leading) pulses of the pulse pairs are around twice as intense as the second pulses. The first and second photodetectors are configured to detect both pulses in the pair and the processing circuitry includes a comparator so that determining the first and second arrival times is based only on the detection of the first, stronger, pulse.

In an embodiment, the processing circuitry is additionally configured to obtain a time separation between first optical pulses and second optical pulses of the optical pulse pairs. The modulation periods are further based on this time separation, by making a fine adjustment to the time delay, $\tau$, based on the time separation of the pulses. This further improves the accuracy when it is the second pulses of the optical pulse pairs that are to be phase modulated and ensures that the phase modulation only affects the second pulse in each pair.

Figure 2:
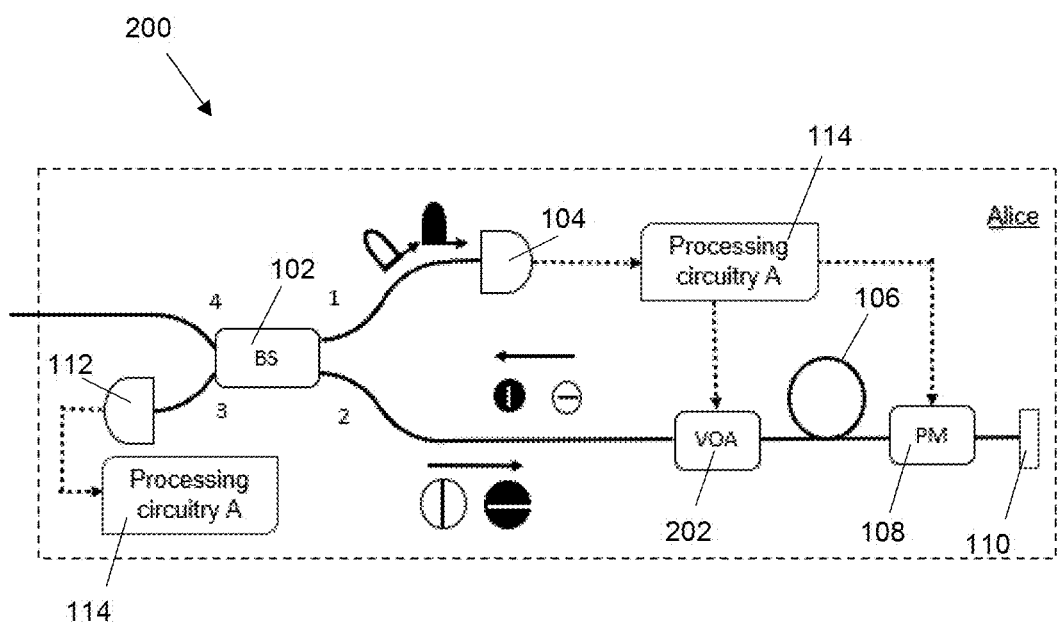

Referring to FIG. 2, in an embodiment the QKD transmitter apparatus 200 further comprises a variable optical attenuator, VOA, 202 provided between the BS 102 and the PM 108. The VOA is configurable with an operating attenuation and with a synchronisation attenuation, which is lower than the operating attenuation. The processing circuitry is configured to generate a control signal configured to cause the VOA to be configured to apply the synchronisation attenuation before the initial pulse train is received. Reducing the attenuation applied to the second pulse train enables detection of the third pulse train optical pulses at the second photodetector 112 during synchronisation.

In an embodiment, the BS 102 is a 90:10 beam splitter, with 90% of the split initial pulse train forming the first pulse train and the 10% of the split initial pulse train forming the second pulse train. The reflected second pulse train in similarly split 90:10, with the 90% forming the third pulse train, detected by the second photodetector 112, and the 10% forming the fourth (return) pulse train.

The BS 102 is configured to receive an initial pulse train of optical pulse pairs. Each optical pulse pair consists of a first optical pulse of a first polarisation and a second optical pulse of the orthogonal polarisation, as illustrated by the black and white discs with lines through.

The polarisation rotation mirror 110 is a Faraday mirror, to VOA 202 is an electronically controllable VOA, the first and second photodetectors are linear photo diode detectors and the storage line 106 has a length of 10 km.

The QKD transmitter 200 may be operated as follows to perform temporal synchronisation of the QKD transmitter with a remote QKD receiver, which is the source of the initial pulse train of optical pulse pairs.

A synchronization signal for the QKD transmitter 200 is using the first photodetector 104, which receives the 90% output of the BS, i.e. the first pulse train. The pulses leaving the 10% output of the BS (the second pulse train) are attenuated by VOA 202. Then the second pulse train traverses the storage line, SL, 106. The length of the storage line is long enough to contain the entire second pulse train; for example, for an initial pulse train of 480 pulses, the storage line has a length of 10 km. Optical pulses of the second pulse train are phase modulated by the PM 108 and reflected by the Faraday Mirror, FM, 110. The PM is configured to modulate the phase of the second pulses of the pulse-pairs. The time separation between the optical pulses forming a pair is only a few dozens of nanoseconds, for example 50 ns, hence the timing of the electric modulation signal for the PM should be very accurate. The accuracy of the timing depends on the length of time it takes for the second pulse train to travel through the storage line; i.e. the time delay applied by the storage line. Any variation of the ambient temperature will result in a change in the length of the storage line and hence change the time delay.

The structure and operation of the QKD transmitter 200 enables the time delay added by the storage line to be determined with a few nanoseconds accuracy, using the following synchronization process:

a) An initial pulse train of optical pulse-pairs is generated by a QKD receiver. Meanwhile, the VOA is configured to apply the synchronization attenuation, in order to decrease the attenuation applied to the optical pulses as compared to that applied during normal, key transmission, operation. This increases the intensity of the optical pulses of the reflected second pulse train so that the second photodetector 112 as able to detect the reflected pulses.

b) The arrival of each pulse-pair is detected with the first photodetector 104 and the first arrival times are determined by the processing circuitry 114. After second pulse train passes through the VOA-storage line-PM-Faraday Mirror—and the same elements in the reverse order, it arrives back at the BS. Now 10% of the pulse energy forms the return (fourth) pulse train, which is sent back to the QKD receiver, while 90% (the third pulse train) is detected by the second photodetector LPDm for each pulse-pair. As a result, the QKD transmitter 200 has two time sequences: the first arrival times $t_i^{in}$ recorded by the first photodetector, and the second arrival times $t_i^{out}$ recorded by the second photodetector. The time delay introduced by the storage line 106 is determined from the first and second arrival times as described above.

Figure 3:
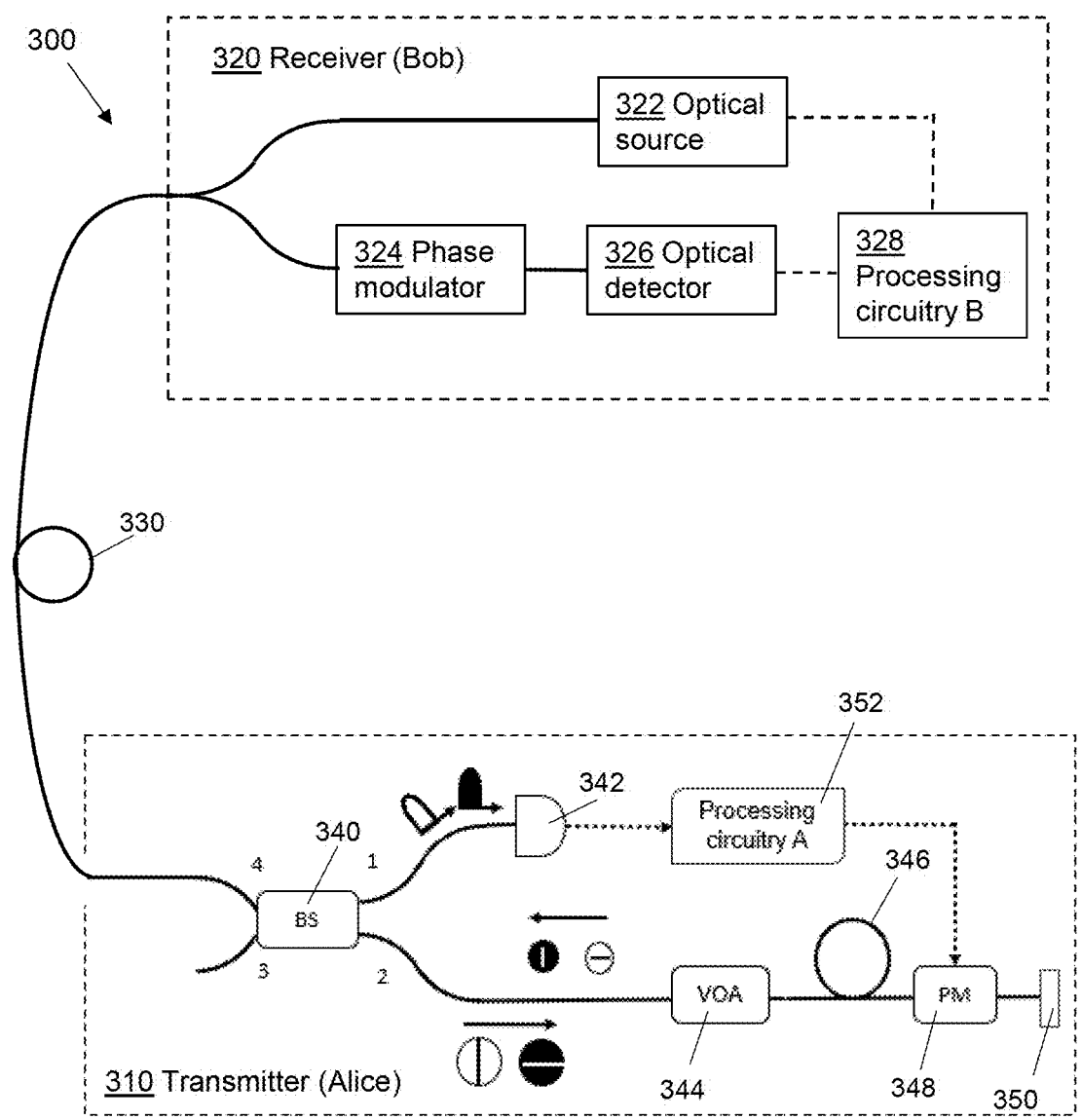
FIGS. 3 and 4 are schematic diagrams illustrating embodiments of an auto-compensating QKD system.

Referring to FIG. 3, an embodiment provides an auto-compensating quantum key distribution, QKD, system 300 comprising a QKD transmitter 310 and a QKD receiver 320.

The QKD receiver, Bob, comprises an optical source 322, an optical phase modulator, PM, 324, an optical detector 326 and processing circuitry, B, 328.

The optical source 322 is configured to transmit an initial pulse train of optical pulses to the QKD transmitter.

The QKD transmitter, Alice, comprises an optical beam splitter, BS, 340, a photodetector 342, a variable optical attenuator, VOA, 344, an optical storage line 346, an optical phase modulator, PM, 348, a polarisation rotation mirror 350 and processing circuitry, A, 352.

The BS is configured to receive the initial pulse train sent from the QKD receiver. The BS is configured to power split the optical pulses of the initial pulse train to form a first pulse train and a second pulse train. The photodetector 342 is provided downstream of a first port 1 of the BS and is configured to detect optical pulses of the first pulse train.

The VOA 344 is provided downstream of a second port 2 of BS 340 and is configured to attenuate optical pulses of the second pulse train. The optical storage line 346 is provided downstream of the VOA and is configured to receive the second pulse train output from the VOA. The PM 348 is provided downstream from the optical storage line and is configured to phase modulate optical pulses of the second pulse train. The polarisation rotation mirror 350 is provided downstream of the PM and is arranged to reflect the optical pulses of the second pulse train back into the PM, from where the reflected second pulse train travels back through the storage line and VOA to port 2 of the BS. In this example, the BS is a four port BS and is therefore further configured to power split optical pulses of the reflected second pulse train to form the return pulse train. The reflected second pulse train is power split to form a third pulse train and a fourth pulse train. The third pulse train is directed to a third port 3 of the BS and is dumped. The fourth pulse train which is output from a fourth port 4 of the BS and forms the return pulse train, sent to the QKD receiver 320.

Alternatively, the BS 340 may be a three port device, such as a multiplexer having a first port connected to a transmission line 330 between the QKD transmitter 310 and the QKD receiver 320, a second port connected to the first photodetector 342 and a third port connected to the VOA 344. The optical pulses of the initial pulse train are power split, as described above, while the optical pulses of the reflected second pulse train are simply routed to the first port, to form the return pulse train.

The processing circuitry is configured to generate a control signal configured to cause the VOA to be configured to apply a synchronisation attenuation before the second pulse train is received. The synchronisation attenuation configured to cause the optical pulses to have a mean photon number of greater than 1.

It will be appreciated that the VOA will also be configurable to apply an operating attenuation, higher than the synchronisation attenuation, during normal, key transmission, operation. The operating attenuation is configured to cause the optical pulses to have a mean photon number of less than 1.

The PM 324 is configured to phase modulate optical pulses of the return pulse train received from the QKD transmitter.

The optical detector 326 is configured to detect optical pulses of the return pulse train. The optical detector has a detection efficiency of less than 1. The processing circuitry, B, 328 is configured to determine arrival times of optical pulses detected at the optical detector and to determine a round trip time from the QKD receiver (Bob) to the QKD transmitter (Alice) and back, based on at least one said arrival time.

Figure 4:
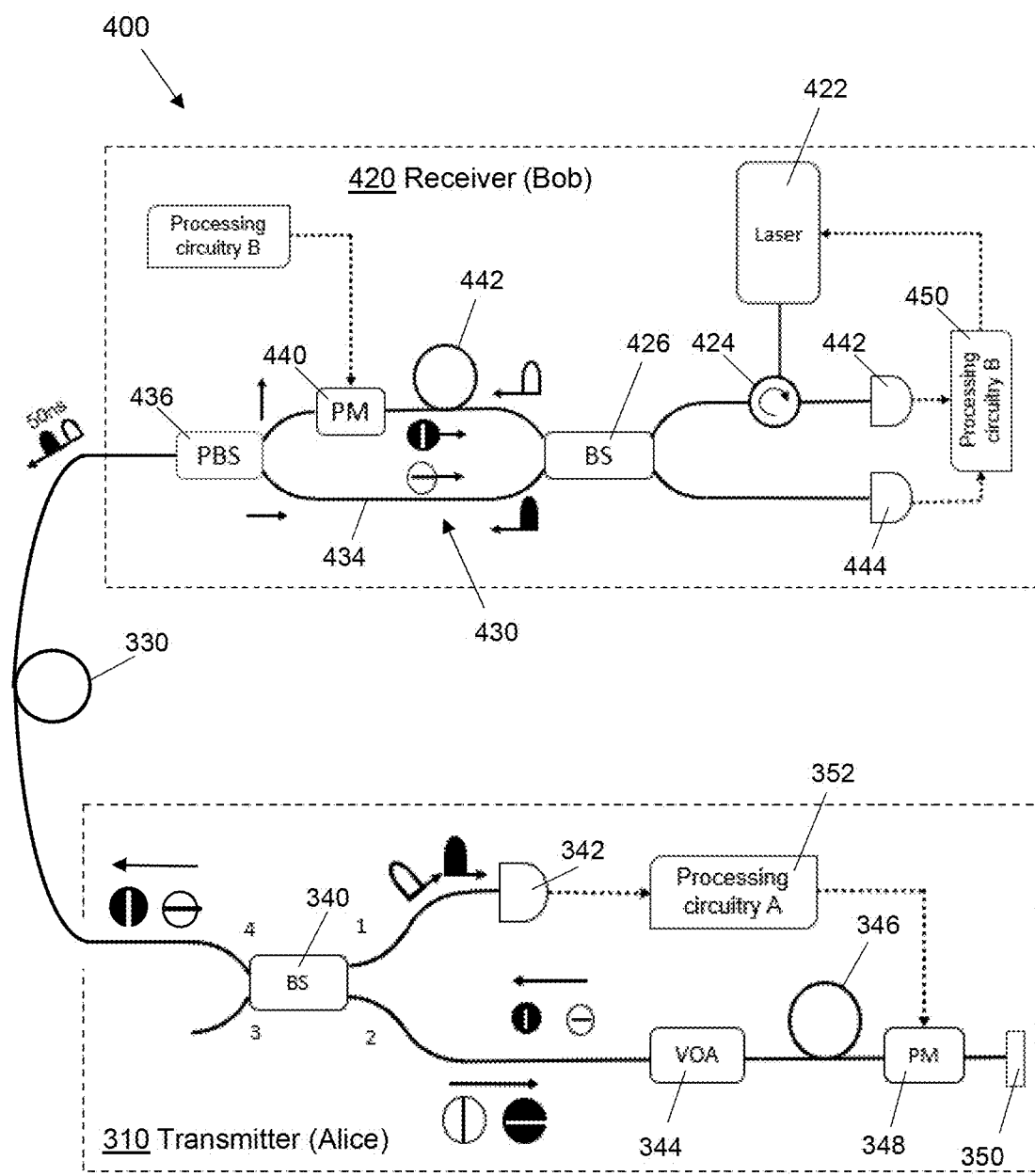

In an embodiment, as illustrated in FIG. 4, the QKD receiver (Bob) 420 of the auto-compensating QKD system 400 comprises an optical source 424, 442, 430, an optical phase modulator, PM, 440, first and second optical detectors 442, 444 and processing circuitry, B, 450.

The optical source comprises a laser 422, an optical circulator 424 and an interferometer 430, comprising an optical beam splitter, BS, 426, and a polarisation beam splitter, PBS, 436, connected by a short arm 434 and a long arm 442 including a delay line and the PM 440. The laser generates a seed pulse train which is routed to the BS via the optical circulator 424 (in the case of an optical fibre based implementation). The seed pulses are power split with the respective split pulses output into the short arm 434 and the long arm 442 of the interferometer; the pulses travelling through the long arm are delayed relative to those travelling through the short arm so that pulse pairs are formed at the output of the PBS 436.

In an embodiment, the laser is configured to generate optical pulses at a 5 MHz pulse rate, i.e. a pulse train having a pulse-pulse time separation of around 200 ns. The seed pulse train contains 480 pulses, therefore the initial pulse train (and thus each of the first and second pulse trains) contains 480 pulse pairs. The delay line at the QKD receiver has a length of around 10 m, to introduce a delay of around 50 ns, thus the optical pulses with the pulse pairs are separated by around 50 ns and the pulse pairs are separated by around 200 ns.

The BS 426 at the QKD receiver is a 50:50 BS. The first and second optical detectors 442, 444 are single-photon avalanche diode, SPAD, photon counters having a single-photon detection efficiency of less than 1.

The storage line at the QKD transmitter has a length of 10 km in order to be able to contain the entire second pulse train of 480 pulse pairs.

The optical phase modulator 440 is configured to phase modulate optical pulses of the return pulse train, received from the QKD transmitter. The first and second optical pulses of each pulse pair received at the PBS are routed into the long and short arms of the interferometer respectively, i.e. into the other interferometer arm, so that they arrive together back at the BS 426, where they interfere depending on their respective phases and the resulting output pulse is routed to either the first SPAD 442 or the second SPAD 444 depending on its phase.

The QKD receiver 420 needs to be synchronized to the return pulse train received from the QKD transmitter 310. However, the pulses of the return pulse train are very weak which means that out of the 480 pulse pairs of the return pulse train only a few may be detected, at random positions within the return pulse train. However, in order to determine the round-trip time from QKD receiver to QKD transmitter and back (i.e. Bob-Alice-Bob) we need to know the arrival time of the first optical pulse (resulting from the superposition/interference of the optical pulses of the first pulse-pair of the return pulse train) at the first or second SPAD 442, 444.

By configuring the VOA 344 to a synchronization attenuation that causes the optical pulses of the second pulse train to have a mean photon number that is greater than 1, we can increase the detection probability of the first optical pulse of the return pulse train. When the VOA is set to the synchronization attenuation (as compared to the higher attenuation used for key transmission) the optical pulses in the return pulse train contain more photons, hence it is more probable that they will be detected at first or second SPAD 442, 444.

In an embodiment, the mean photon number multiplied by the single-photon detection efficiency is at least 1.

The probability that one of the SPADs 442, 444 detects at least one pulse output from the interferometer 430 is $$P = 1 - e^{(-\eta \bar{n})}$$

where $\eta$ is the detection efficiency (which may also be referred to as the quantum efficiency) of the SPADs, $\bar{n}$ is the mean photon number in the optical pulses.

For $\eta \bar{n} \ll 1$, the probability can be approximated to $$P \approx \eta \bar{n}$$

Hence, for $\bar{n}=1$ and $\eta=0.1$ the probability of detection is $P \approx 0.1$.

If we increase the mean photon number in the optical pulse to 10, then $$P = 1 - e^{(-0.1*10)} = 0.63$$

If one of the SPADs 442, 444 detects the first pulse output from the interferometer (resulting from the recombination of the first pulse-pair) the return pulse train, the probabilities are $P_1=0.1$ or 0.63 for $\bar{n}=1$ or 10, respectively. After a SPAD detects the first pulse it is shut off for several microseconds to avoid after-pulsing. Hence several following pulses output from the interferometer (resulting from the superposition of the optical pulses of respective pulse-pairs of the return pulse train) are not detected.

If the first pulse is not detected, but the second one is detected, then the probability is given by $P_2=(1-P)*P$. In general, the probability of detecting the nth optical pulse at one of the SPADs is given by $$P_n = (1-P)^{(n-1)} P$$

As reported by G. Zambra et at, "Experimental reconstruction of photon statistics without photon counting", *Phys. Rev. Lett.*, 95, page 063602, 5 Aug. 2005.

For any detector quantum efficiency and mean photon number we can calculate $P_n$.

The first few values are detailed in Table 1 below, for $\eta \bar{n}=0.1$ and 1.

TABLE 1

The probabilities of detecting the 1st, 2nd, 3rd, and 4th pulses for $\eta \bar{n} = 0.1$ and 1, respectively.

| $P_n$ | $\eta \bar{n}$ | |
| --- | --- | --- |
|  | 0.1 | 1 |
| $P_1$ | 0.095 | 0.632 |
| $P_2$ | 0.086 | 0.233 |
| $P_3$ | 0.078 | 0.085 |
| $P_4$ | 0.070 | 0.031 |

The QKD receiver the PM modulates optical pulses of the return pulse train, after they return from Alice's device. To generate a control signal configured to cause the PM to modulate the optical pulses of the return pulse train the round-trip time should be know with an accuracy better than the pulse-pulse time separation of the seed pulse train (which is the same as the time separation between pulse pairs of the return pulse train).

The first and second SPADs 442, 444 at the QKD receiver are closed during the round trip time of the optical pulses to the QKD transmitter and back, to avoid the optical detectors being in a blind state (unable to detect returning pulses) when the return pulse train arrives. This is achieved by gating the optical detectors with an electric signal. The processing circuitry B 450 is configured to generate a control signal for the optical detectors to configure the optical detector to an active state by the time the return pulse train arrives. This also requires the precise knowledge of the round-trip time.

By increasing the mean photon number of the optical pulses in the return pulse train, it becomes considerably more probable to detect the first pulse output from the interferometer from the first pulse-pair of the return pulse train than the following pulses from the following pulse-pairs. The accuracy of determining the round-trip time is therefore improved.

In an embodiment, the optical source 322, 424, 442, 430 is configured to transmit a plurality of instances of the initial pulse train. That is to say, the initial pulse train is transmitted a plurality of times, in sequence, the next instance of the initial pulse train not being transmitted until the return pulse train of the preceding instance has been received and detected at the QKD receiver.

The QKD receiver further comprises a time-to-digital converter configured to assign timestamps to optical signals detected by the optical detectors 326, 442, 444. The processing circuitry 328, 450 is configured to:
- determine bunching points of the timestamps;
- filter the timestamps to remove timestamps outside detection windows around the bunching points; and
- determine arrival times of detected optical pulses based on the filtered timestamps.

Referring to FIG. 4, in an embodiment, the initial pulse train contains 480 pulses and the processing circuitry 450 is configured to generate a control signal for the laser 422 to cause it to generate of the order of 1000 instances of the pulse seed train, to form 1000 instances of the initial pulse train. The control signal is configured to cause the laser to generate seed pulses at a 5 MHz pulse rate, i.e. a seed pulse train having a pulse-pulse time separation of around 200 ns. The seed pulse train contains 480 pulses, therefore the initial pulse train (and thus each of the first and second pulse trains) contains 480 pulse pairs. The delay line 442 at the QKD receiver has a length of around 10 m, to introduce a delay of around 50 ns, thus the optical pulses with the pulse pairs are separated by around 50 ns and the pulse pairs are separated by around 200 ns. Using 1000 instances of the initial pulse train provides a highly accurate and reliable result for the round-trip time.

The arrival time of the pulses of the return pulse train is given by $$t_n = T + n(\Delta t_{p-p})$$

where T is the round-trip time, n is the pulse number and $\Delta t_{p-p}$ is the pulse-pulse time separation.

Sending the 480 element pulse train will yield 4-5 detections at most at each optical detector 442, 444 (assuming a typical 20 μs dead time for SPAD optical detectors and alternating the phase modulation applied to the pulses of the return pulse train so that every odd pulse is directed to the first SPAD 442 and every even pulse is directed to the second SPAD 444). The arrival time of the optical pulses is recorded by the time to digital converter, which assigns a timestamp to each detection event.

By sending the initial pulse train multiple times one gets a plurality of timestamps around bunching points for each pulse, n, of the return pulse train. In fact a narrow distribution of timestamps can be observed around ideal raster points for each pulse of the return pulse train. However, in addition to true pulse detections, the SPADs 442, 444 will generate false photon counts as a result of detecting dark noise. These noise signals obscure the true optical pulse detections. They are eliminated by filtering the timestamps to remove timestamps outside a 20-30 ns time window around the bunching points for each return pulse.

Arrival times of detected optical pulses are then determined based on the filtered timestamps, from which the round-trip time is calculated as described above.

In an embodiment, the processing circuitry is further configured to determine a repetition rate of the optical pulses of the initial pulse train by Fourier transformation of the filtered timestamps.

Alternatively, the processing circuitry may be configured to average the bunching of the timestamps and then subtract the adjacent approximate timestamp values to determine the repetition rate.

By increasing the mean photon number of the optical pulses of the return pulse train and filtering out the false detection events by means of a time-window, the round trip time of the pulses can be determined with very high accuracy.

Figure 5:
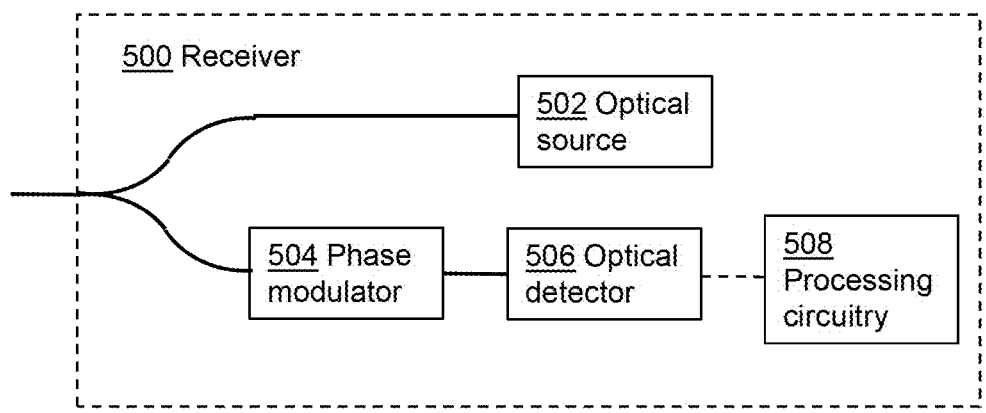
FIGS. 5 and 6 are schematic diagrams illustrating embodiments of a QKD receiver.

Referring to FIG. 5, an embodiment provides a QKD receiver 500 for an auto-compensating QKD system. The QKD receiver comprises an optical source 502, an optical phase modulator, PM, 504, an optical detector 506 and processing circuitry 508.

The optical source 502 is configured to transmit a pulse train of optical pulses.

The PM 504 is configured to phase modulate optical pulses of a return pulse train received from a QKD transmitter of the auto-compensating QKD system.

The optical detector 506 is configured to detect optical pulses of the return pulse train. The optical detector has a detection efficiency of less than 1. The processing circuitry 508 is configured to determine arrival times of optical pulses detected at the optical detector and to determine a round trip time from the QKD receiver to the QKD transmitter and back, based on at least one said arrival time.

Figure 6:
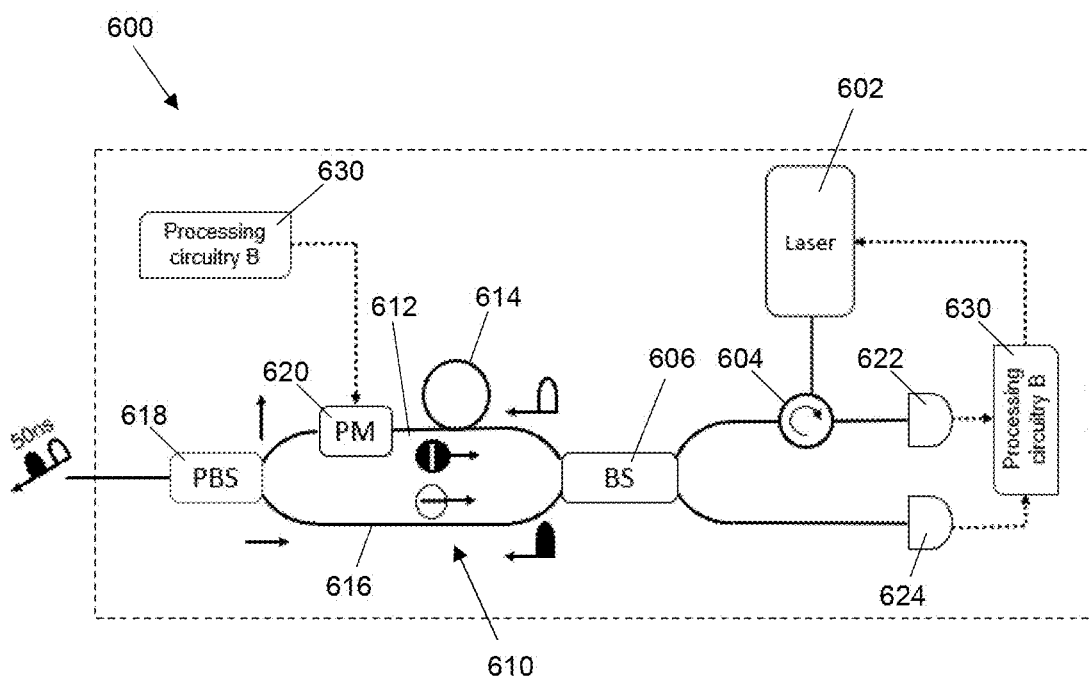

Referring to FIG. 6, an embodiment provides a QKD receiver 600 for an auto-compensating QKD system. The QKD receiver comprises an optical source 602, 610, an optical phase modulator, PM, 620, first and second optical detectors 622, 624 and processing circuitry 630.

The optical source comprises a laser 602 and interferometer 610, comprising an optical beam splitter, BS, 606, and a polarisation beam splitter, PBS, 618, connected by a short arm 616 and a long arm 612 including a delay line 614 and the PM 620. The laser generates a seed pulse train which is routed to the BS via an optical circulator 424 (in the case of an optical fibre based implementation). The seed pulses are power split with the respective split pulses output into the short arm 616 and the long arm 612 of the interferometer; the pulses travelling through the long arm are delayed relative to those travelling through the short arm so that pulse pairs are formed at the output of the PBS 618.

In an embodiment, the laser is configured to generate optical pulses at a 5 MHz pulse rate, i.e. a pulse train having a pulse-pulse time separation of around 200 ns. The seed pulse train contains 480 pulses, therefore the initial pulse train (and thus each of the first and second pulse trains) contains 480 pulse pairs. The delay line at the QKD receiver has a length of around 10 m, to introduce a delay of around 50 ns, thus the optical pulses with the pulse pairs are separated by around 50 ns and the pulse pairs are separated by around 200 ns.

The BS 606 at the QKD receiver is a 50:50 BS. The first and second optical detectors 622, 624 are single-photon avalanche diode, SPAD, photon counters.

The optical phase modulator 620 is configured to phase modulate optical pulses of the return pulse train, received from the QKD transmitter. The first and second optical pulses of each pulse pair received at the PBS are routed into the long and short arms of the interferometer respectively, i.e. into the other interferometer arm, so that they arrive together back at the BS 606, where they interfere depending on their respective phases and the resulting output pulse is routed to either the first optical detector 622 or the second optical detector depending on its phase.

Figure 7:
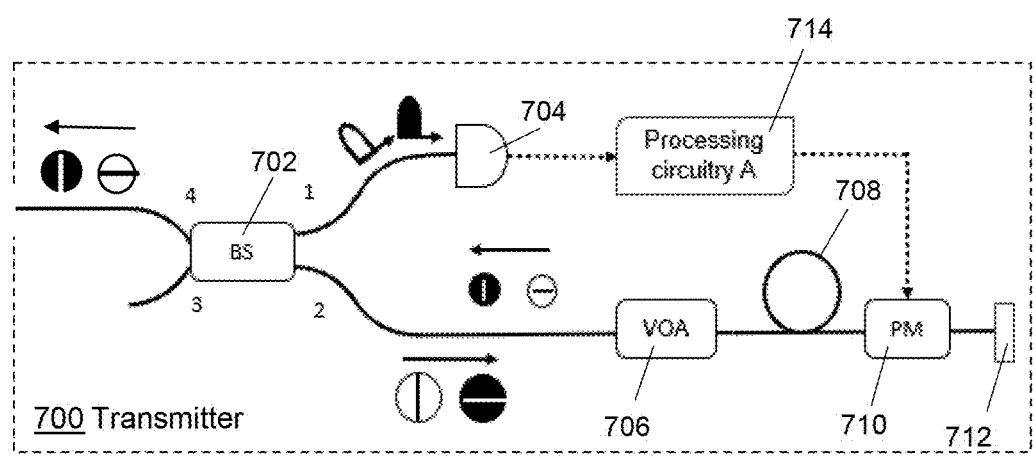
FIG. 7 is a schematic diagram illustrating an embodiment of a QKD transmitter.

Referring to FIG. 7, an embodiment provides a QKD transmitter 700 comprising an optical beam splitter, BS, 702, a photodetector 704, a variable optical attenuator, VOA, 706, an optical storage line 708, an optical phase modulator, PM, 710, a polarisation rotation mirror 712 and processing circuitry, A, 714.

The BS is configured to receive the initial pulse train sent from the QKD receiver. The BS is configured to power split the optical pulses of the initial pulse train to form a first pulse train and a second pulse train. The photodetector 704 is provided downstream of a first port 1 of the BS and is configured to detect optical pulses of the first pulse train.

The VOA 706 is provided downstream of a second port 2 of BS 702 and is configured to attenuate optical pulses of the second pulse train. The optical storage line 708 is provided downstream of the VOA and is configured to receive the second pulse train output from the VOA. The PM 710 is provided downstream from the optical storage line and is configured to phase modulate optical pulses of the second pulse train. The polarisation rotation mirror 712 is provided downstream of the PM and is arranged to reflect the optical pulses of the second pulse train back into the PM, from where the reflected second pulse train travels back through the storage line and VOA to port 2 of the BS. In this example, the BS is a four port BS and is therefore further configured to power split optical pulses of the reflected second pulse train to form the return pulse train. The reflected second pulse train is power split to form a third pulse train and a fourth pulse train. The third pulse train is directed to a third port 3 of the BS and is dumped. The fourth pulse train which is output from a fourth port 4 of the BS and forms the return pulse train.

Alternatively, the BS 702 may be a three port device, such as a multiplexer having a first port for connection to a transmission line, a second port connected to the photodetector 704 and a third port connected to the VOA 706. The optical pulses of the initial pulse train are power split, as described above, while the optical pulses of the reflected second pulse train are simply routed to the first port, to form the return pulse train.

The processing circuitry is configured to generate a control signal configured to cause the VOA to be configured to apply a synchronisation attenuation before the second pulse train is received. The synchronisation attenuation configured to cause the optical pulses to have a mean photon number of greater than 1.

It will be appreciated that the VOA will also be configurable to apply an operating attenuation, higher than the synchronisation attenuation, during normal, key transmission, operation. The operating attenuation is configured to cause the optical pulses to have a mean photon number of less than 1.

Figure 8:
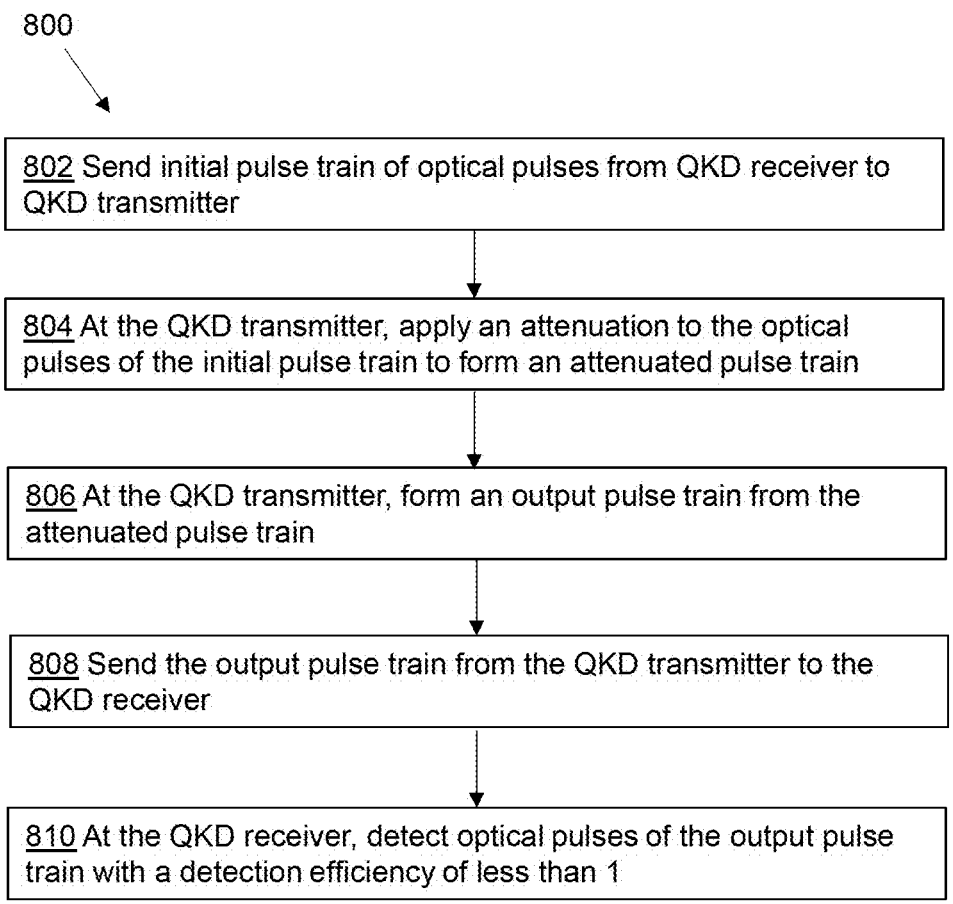

Referring to FIG. 8, an embodiment provides a method 800 of synchronising a quantum key distribution, QKD, receiver and a QKD transmitter of an auto-compensating QKD system.

The method comprises steps of:
sending 802 an initial pulse train of optical pulses from the QKD receiver to the QKD transmitter;
at the QKD transmitter, applying 804 an attenuation to the optical pulses of the initial pulse train to form an attenuated pulse train;
at the QKD transmitter, forming 806 a return pulse train from the attenuated pulse train;
sending (808) the return pulse train from the QKD transmitter to the QKD receiver; and
at the QKD receiver,
detecting (810) optical pulses of the return pulse train with a detection efficiency of less than 1,
wherein the attenuation is configured to cause the optical pulses to have a mean photon number of greater than 1.

In an embodiment, applying 804 an attenuation comprises the following steps, illustrated in FIG. 9:
power splitting 812 the optical pulses of the initial pulse train to form a first pulse train and a second pulse train; and
applying 814 an attenuation to the optical pulses of the second pulse train.

Forming 806 a return pulse train comprises the following steps, illustrated in FIG. 10:
transmitting 816 the attenuated second pulse train through an optical storage line and an optical phase modulator;
polarisation rotating 818 the optical pulses of the second pulse train and reflecting said optical pulse back through the optical phase modulator and the optical storage line; and
power splitting 820 the reflected optical pulses of the second pulse train to form the return pulse train.

In an embodiment, the mean photon number multiplied by the detection efficiency is at least 1.

Figure 11:
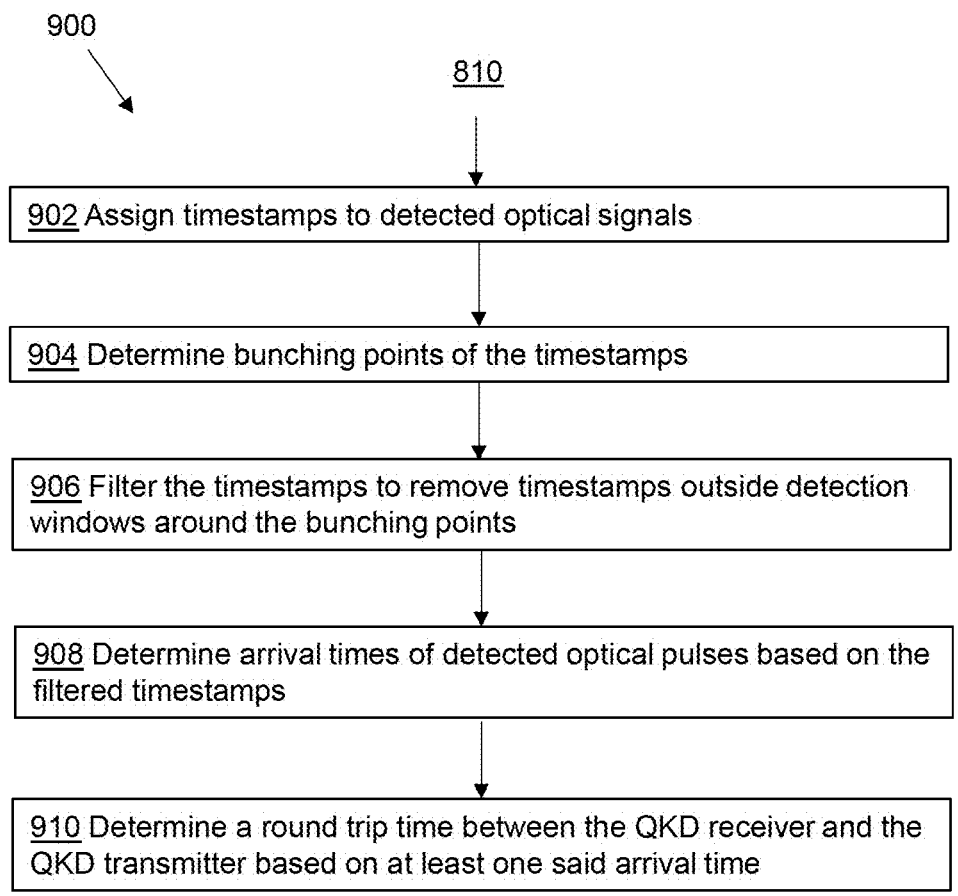

Referring to FIG. 11, in an embodiment the steps illustrated in FIGS. 8 to 10 are performed for a plurality of instances of the initial pulse train.

The method further comprises, at the QKD receiver:
assigning 902 timestamps to detected optical signals;
determining 904 bunching points of the timestamps;
filtering 906 the timestamps to remove timestamps outside detection windows around the bunching points;
determining 908 arrival times of detected optical pulses based on the filtered timestamps; and
determining 910) a round trip time between the QKD receiver and the QKD transmitter based on at least one.

The invention claimed is:

1. A quantum key distribution, QKD, transmitter apparatus comprising:
an optical beam splitter configured to receive an initial pulse train of optical pulse pairs and configured to power split optical pulses of the initial pulse train to form a first pulse train of the optical pulse pairs and a second pulse train of the optical pulse pairs;
a first photodetector configured to detect optical pulses of the first pulse train;
an optical storage line configured to receive the second pulse train;
an optical phase modulator provided at an output of the optical storage line and configured to phase modulate optical pulses of the second pulse train;
a polarisation rotation mirror arranged to reflect the optical pulses of the second pulse train back into the optical phase modulator;
a second photodetector; and
processing circuitry, wherein:
the optical beam splitter is further configured to power split the optical pulses of the reflected second pulse train to form a third pulse train and a fourth pulse train, the fourth pulse train forms a return pulse train of the QKD transmitter and is sent to a QKD receiver,
the second photodetector is configured to detect optical pulses of the third pulse train, and the processing circuitry is configured to:
determine first arrival times, $t_i^n$, of optical pulses detected at the first photodetector;
determine second arrival times, $t_i^{out}$, of optical pulses detected at the second photodetector;

determine a time delay, t, based on a time difference, Dt, between a second arrival time and a respective first arrival time; and generate an electric modulation signal configured to cause the optical phase modulator to phase modulate one of the optical pulses of optical pulse pairs of the second pulse train for modulation periods based on respective first arrival times plus the determined time delay.

2. The QKD transmitter apparatus as claimed in claim 1, wherein the time delay is based on the time difference, Dt, plus a time delay, $Dt_{PD1}$, between the optical beam splitter and the first photodetector, and less a time delay, $Dt_{PD2}$, between the optical beam splitter and the second photodetector.

3. The QKD transmitter apparatus as claimed in claim 1, wherein the processing circuitry is configured to obtain a time separation between first optical pulses and second optical pulses of the optical pulse pairs and wherein the modulation periods are further based on said time separation.

4. The QKD transmitter apparatus as claimed in claim 1, further comprising a variable optical attenuator, VOA, provided between the optical beam splitter and the optical phase modulator, the VOA having an operating attenuation and a synchronisation attenuation, lower than the operating attenuation, and wherein the processing circuitry is configured to generate a control signal configured to cause the VOA to be configured to apply the synchronisation attenuation before the initial pulse train is received.

5. An auto-compensating quantum key distribution, QKD, system comprising a QKD transmitter and a QKD receiver, the QKD receiver comprising:

an optical source configured to transmit an initial pulse train of optical pulses to the QKD transmitter;

an optical phase modulator configured to phase modulate optical pulses of a return pulse train received from the QKD transmitter;

an optical detector configured to detect the optical pulses of the return pulse train, the optical detector having a detection efficiency of less than 1; and processing circuitry configured to determine arrival times of detected optical pulses of the return pulse train and to determine a round trip time between the QKD receiver and the QKD transmitter based on at least one said arrival time, the QKD transmitter comprising:

an optical beam splitter configured to receive the initial pulse train and configured to power split the optical pulses of the initial pulse train to form a first pulse train and a second pulse train;

a photodetector configured to detect optical pulses of the first pulse train;

a variable optical attenuator, VOA, configured to attenuate optical pulses of the second pulse train;

an optical storage line configured to receive the second pulse train output from the VOA;

an optical phase modulator provided at an output of the optical storage line and configured to phase modulate optical pulses of the second pulse train;

a polarisation rotation mirror arranged to reflect the optical pulses of the second pulse train back into the optical phase modulator; and processing circuitry, wherein the optical beam splitter is further configured to form the reflected second pulse train into the return pulse train, and the processing circuitry is configured to generate a control signal configured to cause the VOA to be configured to apply a synchronisation attenuation before the second pulse train is received, the synchronisation attenuation configured to cause the optical pulses of the second pulse train to have a mean photon number of greater than 1.

6. The system as claimed in claim 5, wherein the mean photon number multiplied by the detection efficiency is at least 1.

7. The system as claimed in claim 5, wherein the optical source is configured to transmit a plurality of instances of the initial pulse train and wherein the QKD receiver further comprises a time-to-digital converter configured to assign timestamps to optical signals detected by the optical detector, and wherein the processing circuitry is configured to:

determine bunching points of the timestamps;

filter the timestamps to remove timestamps outside detection windows around the bunching points; and determine arrival times of detected optical pulses based on the filtered timestamps.

8. The system as claimed in claim 7, wherein the processing circuitry is further configured to determine a repetition rate of the optical pulses of the initial pulse train by Fourier transformation of the filtered timestamps.

9. A QKD receiver for an auto-compensating QKD system, the QKD receiver comprising:

an optical source configured to transmit a pulse train of optical pulses;

an optical phase modulator configured to phase modulate optical pulses of a return pulse train received from a QKD transmitter of the auto-compensating QKD system;

an optical detector configured to detect the optical pulses of the return pulse train, the optical detector having a detection efficiency of less than 1; and processing circuitry configured to determine arrival times of detected optical pulses of the return pulse train and to determine a round trip time between the QKD receiver and the QKD transmitter based on at least one said arrival time.

10. A QKD transmitter for an auto-compensating QKD system, the QKD transmitter comprising:

an optical beam splitter configured to receive an initial pulse train and configured to power split optical pulses of the initial pulse train to form a first pulse train and a second pulse train;

a photodetector configured to detect optical pulses of the first pulse train;

a variable optical attenuator, VOA, configured to attenuate optical pulses of the second pulse train;

an optical storage line configured to receive the second pulse train output from the VOA;

an optical phase modulator provided at an output of the optical storage line and configured to phase modulate the optical pulses of the second pulse train;

a polarisation rotation mirror arranged to reflect the optical pulses of the second pulse train back into the optical phase modulator; and processing circuitry, wherein the optical beam splitter is further configured to form the reflected second pulse train into a return pulse train of the QKD transmitter, and the processing circuitry is configured to generate a control signal configured to cause the VOA to be configured to apply a synchronisation attenuation before the second pulse train is received, the synchronisation attenuation configured to cause the optical pulses to have a mean photon number of greater than 1.

11. A method of synchronising a quantum key distribution, QKD, receiver and a QKD transmitter of an auto-compensating QKD system, the method comprising:
    sending an initial pulse train of optical pulses from the QKD receiver to the QKD transmitter;
    at the QKD transmitter, applying an attenuation to the optical pulses of the initial pulse train to form an attenuated pulse train;
    at the QKD transmitter, forming a return pulse train from the attenuated pulse train;
    sending the return pulse train from the QKD transmitter to the QKD receiver; and
    at the QKD receiver,
    detecting optical pulses of the return pulse train with a detection efficiency of less than 1, wherein the attenuation is configured to cause the optical pulses of the return pulse to have a mean photon number of greater than 1.

12. The method as claimed in claim 11, wherein:
    applying an attenuation comprises:
        power splitting the optical pulses of the initial pulse train to form a first pulse train and a second pulse train; and
        applying an attenuation to the optical pulses of the second pulse train;
    forming a return pulse train comprises:
        transmitting the attenuated second pulse train through an optical storage line and an optical phase modulator;
        polarisation rotating the optical pulses of the second pulse train and reflecting said optical pulse back through the optical phase modulator and the optical storage line; and
        power splitting the reflected optical pulses of the second pulse train to form the return pulse train.

13. The method as claimed in claim 11, wherein the mean photon number multiplied by the detection efficiency is at least 1.

14. The method as claimed in claim 11, wherein the operations are performed for a plurality of instances of the initial pulse train and the method further comprises, at the QKD receiver:
    assigning timestamps to detected optical signals;
    determining bunching points of the timestamps;
    filtering the timestamps to remove timestamps outside detection windows around the bunching points;
    determining arrival times of detected optical pulses of the return pulse train based on the filtered timestamps; and
    determining a round trip time between the QKD receiver and the QKD transmitter based on at least one said arrival time.

* * * * *